G. RIGG.
TREATMENT OF SAL AMMONIAC SKIMMINGS.
APPLICATION FILED NOV. 12, 1910.
1,002,317.
Patented Sept. 5, 1911.
2 SHEETS—SHEET 1.
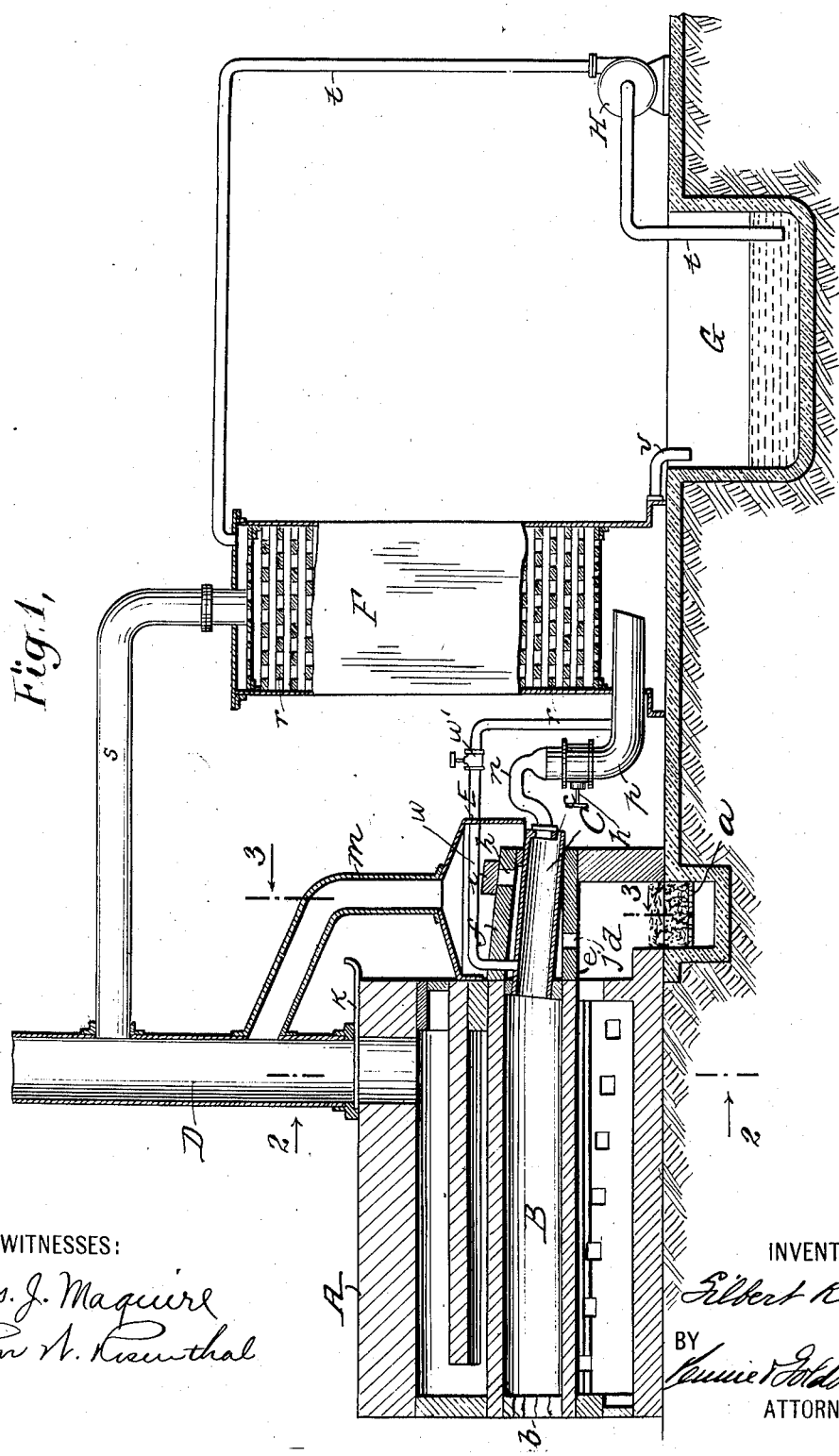
WITNESSES:
Thos. J. Maguire
Leon N. Rosenthal
INVENTOR:
Gilbert Rigg,
BY
Jennie T. Goldsborough
ATTORNEYS.

G. RIGG.
TREATMENT OF SAL AMMONIAC SKIMMINGS.
APPLICATION FILED NOV. 12, 1910.
1,002,317.
Patented Sept. 5, 1911.
2 SHEETS—SHEET 2.
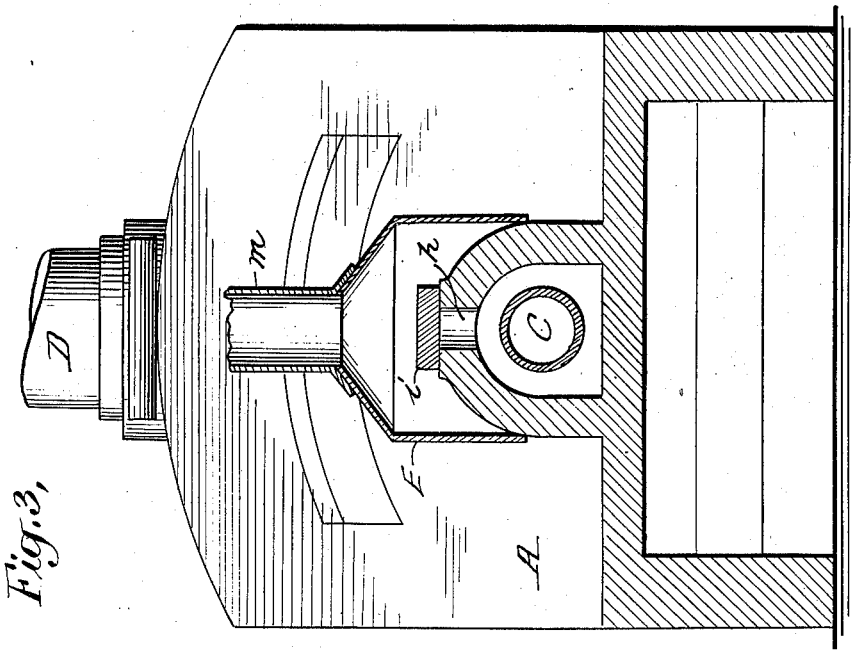
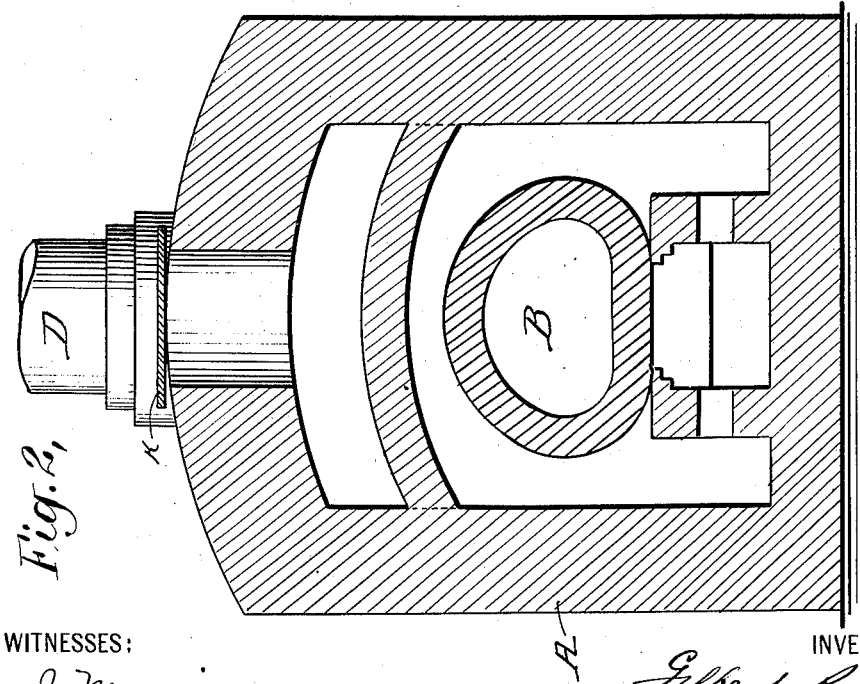
WITNESSES:
INVENTOR:
Gilbert Rigg,
BY
ATTORNEYS.

UNITED STATES PATENT OFFICE.

GILBERT RIGG, OF PALMERTON, PENNSYLVANIA.

TREATMENT OF SAL-AMMONIAC SKIMMINGS.

1,002,317.  Specification of Letters Patent.  Patented Sept. 5, 1911.

Application filed November 12, 1910. Serial No. 592,001.

*To all whom it may concern:*

Be it known that I, GILBERT RIGG, a subject of the King of Great Britain, having a residence and post-office address at Palmerton, county of Carbon, State of Pennsylvania, have invented certain new and useful Improvements in the Treatment of Sal-Ammoniac Skimmings; and I do hereby declare the following to be a full, clear, and exact description of the invention, such as will enable others skilled in the art to which it appertains to make and use the same.

My invention relates to certain new and useful improvements in the treatment of sal ammoniac skimmings for the recovery of the chlorids of zinc and ammonium contained therein, and for the production of a residuum adapted for use as a spelter material, or as a material for the production of zinc compounds.

The leading or characteristic feature of my invention consists in recovering the zinc chlorid in a liquid state and in a condition practically free from ammonium chlorid, the liquid zinc chlorid separating out, in its substantial entirety, from the vapors of ammonium chlorid, in the condensing receptacle. The process is preferably a continuous one, in the sense that the vapors of zinc chlorid and of ammonium chlorid are distilled over from a heated retort containing the sal ammoniac skimmings and are received in a condenser, wherein the temperature prevailing is regulated so as to be above the condensing point of the ammonium chlorid vapors and between the melting point and the boiling point of zinc chlorid (preferably nearer the boiling point than the melting point of the zinc chlorid) with the resultant effect that the zinc chlorid vapors are liquefied and may be tapped off continuously from the condenser, and the ammonium chlorid vapors (together with such minor fraction of the zinc chlorid as may have escaped liquefaction) are conveyed off continuously to a suitable absorber, or the like.

The practically quantitative recovery of the zinc chlorid in the liquid form is due to the circumstance that the mixed vapors of zinc chlorid and ammonium chlorid enter the condenser in a transparent state, because of the conditions under which they are produced, which exclude damp air and products of combustion from admixture with them, and to the further circumstance that the vapors are not suddenly chilled when they enter the condenser. I have discovered that the presence of damp air, or of products of combustion, or the sudden chilling of the mixed vapors, occasion the formation of a tenuous fume clouding the otherwise transparent vapors and exceedingly difficult to condense. I believe that I am the first to have recognized the prejudicial influence of the factors referred to, and the first to have devised a process obviating and avoiding them.

In the accompanying drawings, Figure 1 represents a longitudinal central section, partly in elevation, of apparatus suitable for the practice of the invention; Figs. 2 and 3 represent, on a somewhat larger scale, sections on the lines 2—2 and 3—3 respectively.

Similar letters of reference indicate similar parts throughout the several views.

Referring to the drawings, A indicates a heating furnace, having a suitable perforated grate, indicated at $a$, upon which is charged the fuel, consisting preferably of a mixture of three parts hard coal to one part soft coal, the combustion being urged in any convenient manner, as, for instance, by a steam blower giving a regulable forced draft.

B indicates a fire-clay retort which may conveniently be 10 feet long, 2 feet 4 inches wide and 1 foot 4 inches high. This retort is set in the furnace, as shown, so that the furnace gases may take their way through the passages indicated, which are designed to so distribute the heat as to keep it substantially uniform from end to end of the retort. The rear end of the retort, after the insertion of the skimmings charge is adapted to be closed by tiles $b$ luted in with loam, so as to be air-tight. At the front end of the retort is located the condenser C, which may conveniently be a fire-clay tube partially closed at one end. Its open end is built into the retort B, and, at its forward end, it is provided with an aperture $c$ to permit the condensed zinc chlorid to flow out. The condenser extends over the top of the fire box $d$ which is covered with tiles $e$. A brick hood $f$ is built around the condenser, and is provided with a port $h$ which can be wholly or partially opened or closed as desired, as, for instance, through the instrumentality of a brick $i$. A suitable opening or openings, as, for instance, the opening $j$ allows fire gases to enter the hood and may itself be wholly or partially opened or closed as desired. This arrangement enables the temperature of the condenser to be varied at will.

The furnace is provided with a stack D for the products of combustion said stack having a regulating slide valve $k$ or the like, and a metal hood E and pipe $m$ deliver likewise into the stack any products of combustion that may be given off from the brick hood of the condenser.

From the condenser C, a stone-ware siphon $n$ connects with an iron pipe $p$ having a cut-off valve $h$ which pipe passes into the base of an absorbing tower F, having a filling of checker work $r$, as, for instance, fire brick. The tower is connected by a draft-pipe $s$ with the stack D, and is supplied with water from the well G, by the centrifugal pump H, and the pipes $t$ shown, and a return pipe $v$ leads back to the well. It will, of course, be understood that this wash tower is but illustrative of one of a number of equivalent devices which might be employed for the recovery of the ammonium salt. In the wash tower, the same water is circulated from the well and returned thereto until sufficiently saturated with the ammonium salt to be worth concentrating. A pipe $w$ having a suitable cut-off valve $w'$ is provided, to carry off the steam and ammonia which come off during the early stages of the operation and which would otherwise tend to chill the condenser.

The mode of operation of the invention may be briefly described as follows: The sal ammoniac skimmings consisting, as usual, of zinc oxid, metallic zinc, zinc chlorid, ammonium chlorid, and foreign matter, such as fuel, fuel ash, etc., is charged into the retort B, and the retort is then carefully closed and luted at its rear end. Before charging the skimmings into the retort they may be mixed with coke breeze, of say a size that will, in screening pass through a screen of one-half inch mesh. With certain kinds of very fusible skimmings, this admixture tends to prevent the formation of a tough cake which would part with its chlorids more slowly. With such skimmings, the time required for the furnace operation is materially shortened by this expedient and the operation as a whole is correspondingly facilitated.

Under the influence of the heat of the products of combustion from the fire box, the volatile matters of the retort charge are driven off in stages. The charge melts down in the furnace and the water is driven off as steam. Shortly after the evolution of steam has begun, free ammonia makes its appearance and continues until the steam has been expelled, these preliminary products being carried off by means of the pipe $w$. During this period the cut-off valve $w'$ in the pipe $w$ is open and the cut-off valve $h$ in the pipe $p$ is closed. Finally, after the water has been driven off, the zinc chlorid is expelled, and also the remainder of the ammonia (as ammonium chlorid). At the beginning of this stage, the cut-off valve $w'$ is closed and the cut-off valve $h$ is opened. The condenser, in the meantime, has been brought to the desired temperature by admitting a regulable amount of the fire gases into the space between the condenser and the outlying brick hood. Upon the proper regulation of the temperature conditions prevailing in the condenser, the efficiency of the process depends, and, to this end, the temperature of the condenser is maintained above that of the melting point of zinc chlorid (260° C.) and below its boiling point (730° C.), but nearer to the boiling point than to the melting point thereof and, preferably, at say from 500° C. to 600° C. In general the temperature of the condenser is adjusted so that the zinc chlorid flows out at a dull red heat. Under these circumstances, the zinc chlorid condenses to the liquid form with remarkable ease and issues from the condenser in a molten stream, through the tap aperture provided for the purpose. The temperature in the condenser is higher than the condensing temperature of the ammonium chlorid vapors, and the condenser therefore acts as a separator of the zinc chlorid from the ammonium chlorid vapors, which latter (together with any minor portion of uncondensed zinc chlorid) pass on into the wash tower or its equivalent, where they are recovered by absorption. When the absorption has reached the required stage, the well water may be concentrated, in any suitable manner, for the recovery of salammoniac. When the ammonium chlorid vapors are accompanied with a portion of uncondensed zinc chlorid vapors, there is also recoverable from the well water a corresponding quantity of galvanizer's crystals ($2NH_4Cl;ZnCl_2$).

As hereinbefore indicated, the ammonium chlorid vapors, instead of being passed through a wash tower, may be recovered by passing them into a series of condensing chambers, under temperature conditions which will deposit them therein, thereby avoiding absorption and subsequent concentration; but, in general, the wash tower is found an efficient agent for their recovery and is readily managed and operated.

In the early stages of the operation, the watery vapor having been driven off from the charge, the vapors of zinc chlorid and ammonium chlorid pass into the condenser, free of moisture and out of contact either with damp air or with products of combustion. In view of this circumstance and also because the vapors suffer no sudden chilling upon entering the condenser, they occupy it as a transparent mixture, devoid of tenuous and difficultly-condensable fume which would otherwise be produced therein. After the zinc chlorid and ammonium chlorid have been worked off from the charge, the residue in the retort B forms a zinkiferous material, containing zinc oxid, at times some metallic zinc and the fixed impurities originally present in the sal ammoniac skimmings, but substantially free from chlorin and ammonia. This residue is suitable either for the production of spelter, or for the production of zinc compounds as, for instance, oxid of zinc, or zinc salts.

Having thus described my invention, what I claim is:

1. The method of treating sal ammoniac skimmings for the recovery of the chlorids and the production of a residue suitable for the making of spelter, which consists in heating the skimmings to a temperature above the boiling point of zinc chlorid, thereby volatilizing the zinc chlorid and ammonium chlorid and condensing the zinc chlorid to liquid form while avoiding the presence of a difficultly-condensable fume in the condenser by preventing sudden chilling of the vapors and keeping them out of contact with damp air and products of combustion; substantially as described.

2. The method of treating sal ammoniac skimmings, which consists in heating them to a temperature above the boiling point of zinc chlorid, thereby volatilizing the zinc chlorid and the ammonium chlorid, receiving the volatilized chlorids in a suitable condensing space and maintaining therein a temperature above the melting point of zinc chlorid and below its boiling point, whereby the zinc chlorid is recovered in the liquid state; substantially as described.

3. The method of treating sal ammoniac skimmings, which consists in heating them to a temperature above the boiling point of zinc chlorid, thereby volatilizing the zinc chlorid and the ammonium chlorid, receiving the volatilized chlorids in a suitable condensing space and maintaining therein a temperature above the melting point of zinc chlorid and below its boiling point, but nearer to the boiling point than to the melting point; substantially as described.

4. The method of treating sal ammoniac skimmings, which consists in heating them to a temperature above the boiling point of zinc chlorid, thereby volatilizing the zinc chlorid and ammonium chlorid, receiving the volatilized chlorids in a suitable condensing space and maintaining therein a temperature above the melting point of zinc chlorid and below its boiling point, and above the condensing point of the ammonium chlorid; substantially as described.

5. The method of treating sal ammoniac skimmings, which consists in heating them to a temperature above the boiling point of zinc chlorid, thereby volatilizing the zinc chlorid and ammonium chlorid, receiving the volatilized chlorids in a suitable condensing space and maintaining therein a temperature above the melting point of zinc chlorid and below its boiling point, and above the condensing point of the ammonium chlorid and finally recovering the ammonium chlorid fumes by absorption; substantially as described.

6. The method of treating sal ammoniac skimmings, which consists in heating them to a temperature above the boiling point of zinc chlorid, thereby volatilizing the zinc chlorid and the ammonium chlorid, receiving the volatilized chlorids continuously in a suitable condensing space, maintaining therein a temperature above the melting point of zinc chlorid and below its boiling point and above the condensing point of ammonium chlorid, continuously drawing off the liquefied zinc chlorid and continuously drawing off the ammonium chlorid vapors; substantially as described.

7. The method of treating sal ammoniac skimmings, which consists in admixing with the sal ammoniac skimmings a quantity of solid fuel adapted to keep the charge open while it is disengaging its chlorids, heating the skimmings to a temperature above the boiling point of zinc chlorid, thereby volatilizing the zinc chlorid and ammonium chlorid, and condensing the zinc chlorid to liquid form while avoiding the presence of a difficultly-condensable fume in the condenser by preventing sudden chilling of the vapors and keeping them out of contact with damp air and products of combustion.

In testimony whereof I affix my signature, in presence of two witnesses.

GILBERT RIGG.

Witnesses:
E. G. TACY,
JOHN C. PENNIE.